United States Patent
Kline et al.

[15] 3,706,430
[45] Dec. 19, 1972

[54] AIRFOIL FOR AIRCRAFT

[72] Inventors: Richard L. Kline, 24 Mersereau Avenue, Mount Vernon, N.Y. 10553; Floyd F. Fogleman, 14 Drumlin Drive, Morris Plains, N.J. 07950

[22] Filed: March 17, 1970

[21] Appl. No.: 20,195

[52] U.S. Cl..................................244/35, 416/237
[51] Int. Cl....................................B64c 3/14
[58] Field of Search..................................244/35, 45 42R, 42DA, 42DB, 244/12, 13, 39

[56] References Cited

UNITED STATES PATENTS 2,974,927   3/1961   Johnson..........................415/181 X
3,203,647   8/1965   Alvarez-Calderon..................244/42
2,562,227   7/1951   Zobel.....................................244/35

*Primary Examiner*—Milton Buchler
*Assistant Examiner*—Carl A. Rutledge
*Attorney*—Orin R. Severn

[57]   ABSTRACT

An airfoil for fixed and rotary wing aircraft comprising a continuous upper surface that joins with a generally planar portion of the under surface at the leading edge to form the apex of a wedge-like airfoil section that extends toward and terminates abruptly in advance of the trailing edge.

6 Claims, 21 Drawing Figures

(SECTION TAKEN AT FUSELAGE)

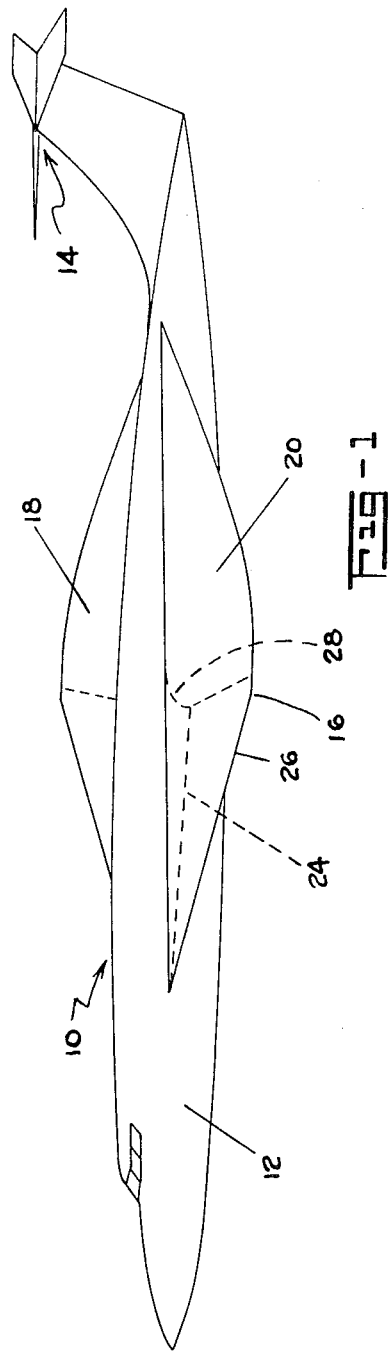
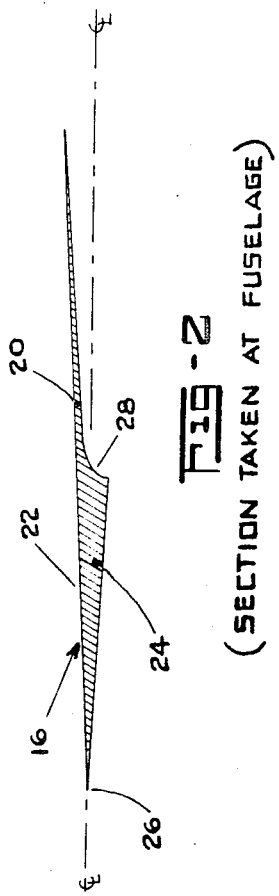

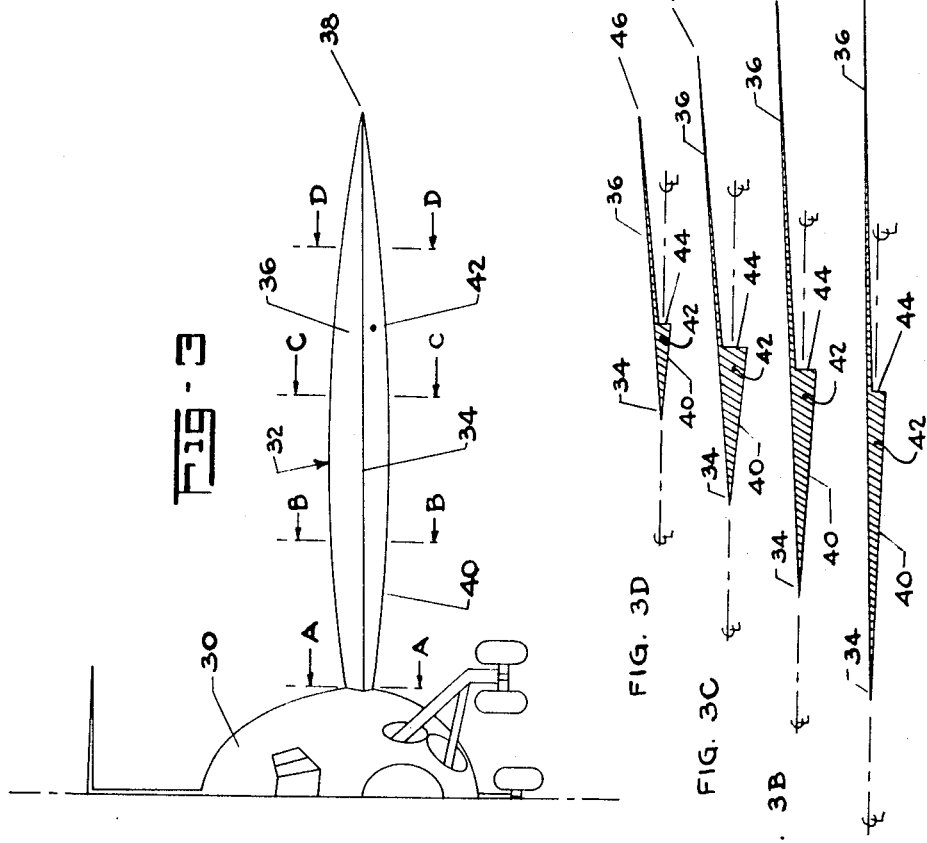

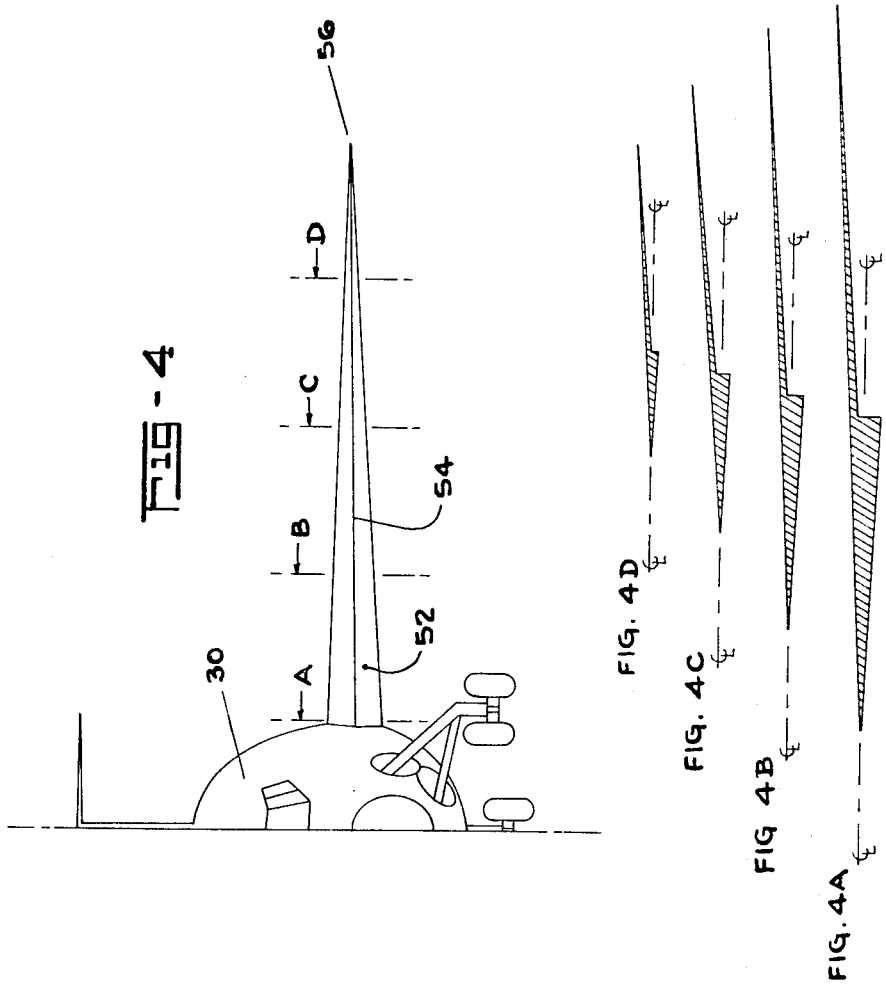

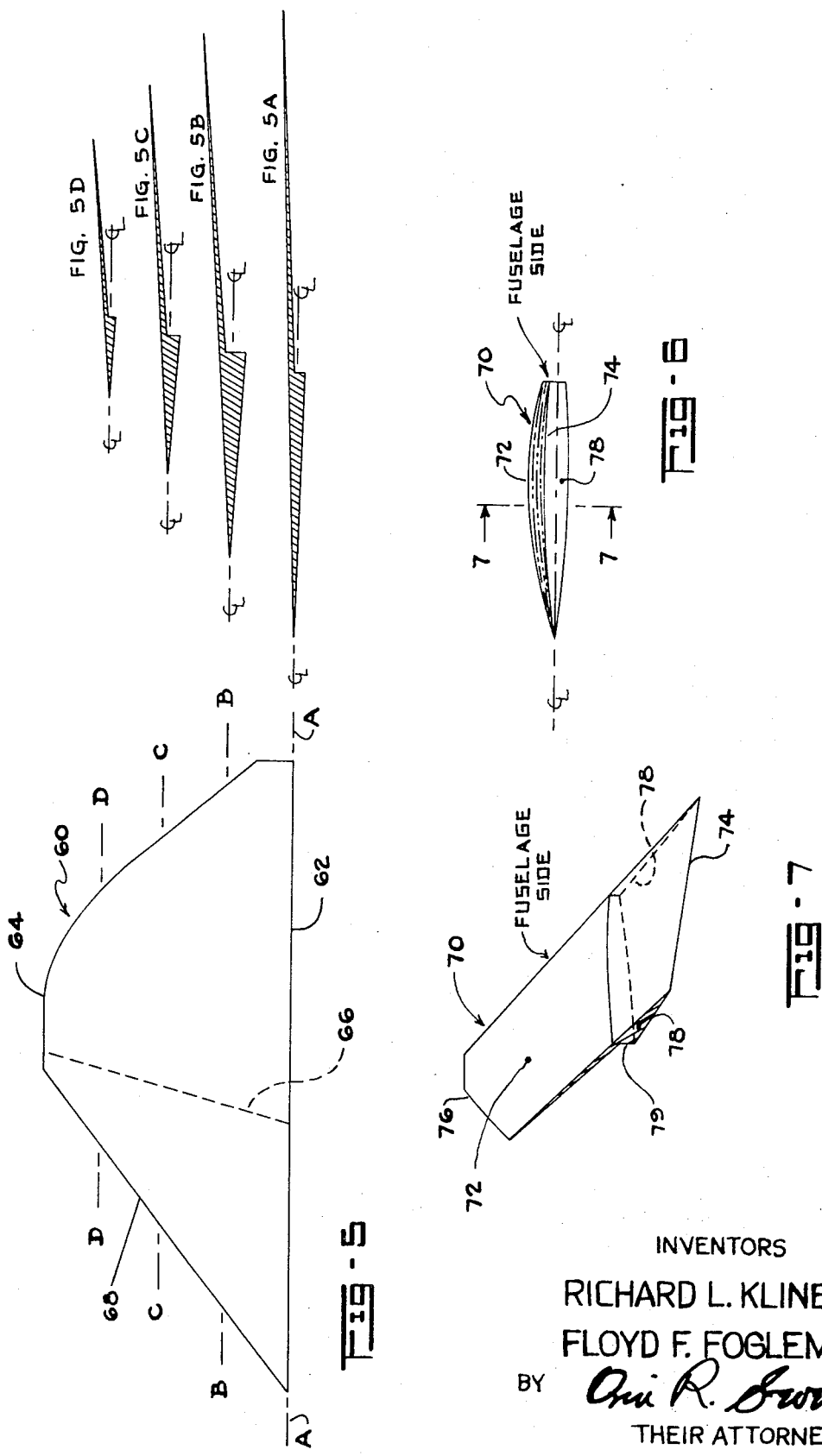

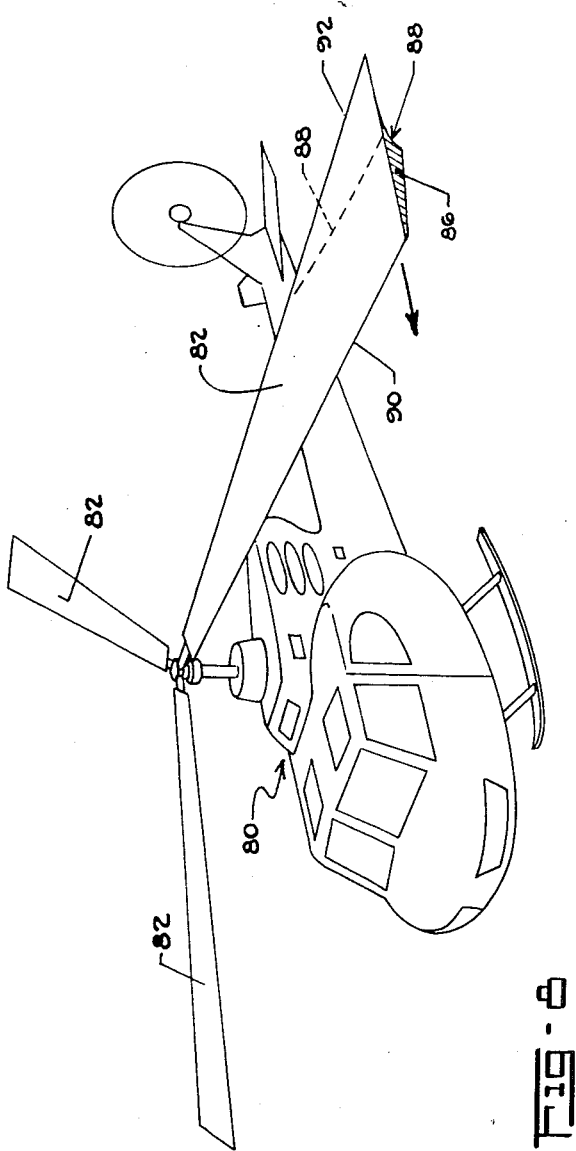
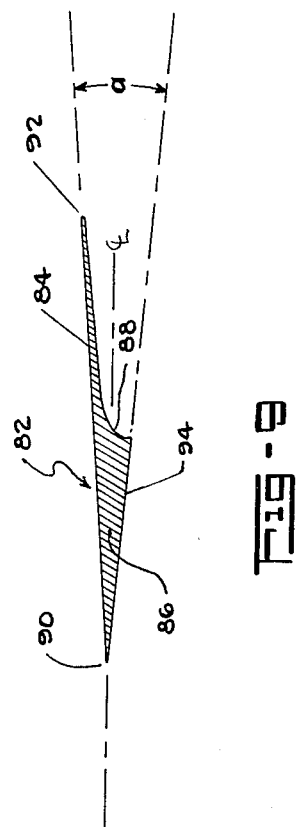
FIG-8
FIG-9
INVENTORS
RICHARD L. KLINE
FLOYD F. FOGLEMAN
BY *[signature]*
THEIR ATTORNEY 3,706,430

AIRFOIL FOR AIRCRAFT

BACKGROUND OF THE INVENTION

The invention relates to airfoils, especially airfoils having lift and drag characteristics suitable for aircraft wing sections and the like. In the comparatively low or subsonic speed range, the conventional airfoil has cambered surfaces that define a profile of gradually decreasing thickness from the leading edge to the trailing edge. For high or supersonic speeds, the airfoil camber is comparatively small and the wing thin so that the upper and under surfaces tend to be substantially planar.

It follows therefore, that the drag characteristics of the subsonic airfoil are not suitable for supersonic speed, whereas the lift characteristics of the supersonic airfoil are not well suited for low airspeeds. The present invention is concerned with providing a new and basic airfoil design that can be readily varied to meet the requirements of a wide range of airspeeds.

SUMMARY OF THE INVENTION

In accordance with the invention, an air foil having a basic design that lends itself to use in aircraft throughout a wide range of airspeeds, comprises a continuous upper surface, and a stepped under surface. The leading edge of the airfoil is defined by the apex of a wedge-shape section that is formed by angular convergence of the upper surface and a generally planar portion of the under surface. Starting at the leading edge, the diverging under surface terminates abruptly in advance of the trailing edge to form on the airfoil under surface a step-like discontinuity that extends span-wise of the airfoil. Rearward of the discontinuity, i.e. the base of the wedge-shape section, the airfoil has a comparatively thin cross-section that terminates as the trailing edge of the airfoil proper.

For varying drag and lift characteristics according to airspeed, the apex angle of the wedge-shape section can be varied, and the diverging under side can be shortened or lengthened to vary the location of the defined step with respect to the trailing edge.

A principal object of the invention therefore, is a new and improved airfoil for aircraft having a minimum of design parameters for adapting the airfoil to a wide range of airspeeds.

A further object of the invention is an airfoil of the character above having a continuous upper surface and a lower surface having a stepped discontinuity, the surfaces being angularly and spacially related to define a chord section that increases in thickness from the leading edge of the airfoil to the discontinuity.

A related object is an improved airfoil as defined above, having advantageously combined lift, drag and stability characteristics.

These and other objects, features and advantages will become apparent from the following description with reference to the accompanying drawings.

BRIEF DESCRIPTION OF THE DRAWINGS

FIG. 1 is a side view, in partial perspective, of high speed fixed-wing aircraft having airfoils embodying the invention;

FIG. 2 is a cross-sectional view of one of the airfoils taken at the indicated junction of the airfoil and aircraft fuselage as shown in FIG. 1;

FIG. 3 is a front half-section view of aircraft showing a wing airfoil typical of the invention;

FIGS. 3A to 3D inclusive, are sectional views of the airfoil taken respectively, at the correspondingly lettered section locations of FIG. 3;

FIG. 4 is a front half-section view of aircraft showing the airfoil in a modified form;

FIGS. 4A to 4D inclusive, are sectional views taken respectively, at the correspondingly lettered section locations of FIG. 4;

FIG. 5 is a plan view of the airfoil shown in FIG. 3;

FIGS. 5A to 5D inclusive, are sectional views of the airfoil taken respectively, at the correspondingly lettered section locations of FIG. 5;

FIG. 6 is a leading-edge view of the airfoil of FIG. 5 taken from the right as shown;

FIG. 7 is a perspective view of a cross-section taken along the line 7—7 of FIG. 6;

FIG. 8 is a perspective view of a rotary wing type aircraft embodying the invention, and FIG. 9 is an enlarged view of the peripheral edge section of a rotary airfoil as shown in FIG. 8.

DESCRIPTION OF PREFERRED EMBODIMENT

The airfoil of the invention is illustrated in FIGS. 1 and 2 as applied by way of example, to fixed-wing aircraft of the high speed type. It will be understood however from the following description that the invention is not limited to high speed or even fixed wing types, and that it can advantageously be used in rotary wing aircraft, and also in comparatively small, low-speed aircraft of the propeller-driven type, as well as in intermediate speed types.

Referring first to FIG. 1, the aircraft 10 comprises a conventional streamlined fuselage 12 with empennage 14 and swept-back wings 16 and 18 that constitute the improved airfoils of the invention. The lateral edges of the wings converge toward the rear of the fuselage so that as viewed from above, the composite area of the wings is of generally diamond configuration. Since descriptions of remaining equipment, such as thrust engines, landing gear, etc. are unnecessary for understanding the invention, these items are not shown in the drawings; it is sufficient to mention that conventional jet engines can be carried by the wing structure in suitable manner (suspension, cantilever, etc.) according to aircraft CG and other factors.

The airfoils constituting the wings 16 and 18 in FIG. 1, are mounted on the fuselage so as to have a small angle-of-attack according to usual practice when the aircraft is on the runway. Each wing, taking for example wing 16 and referring now to FIG. 2, comprises an extensive main section 24 that extends from along the wing leading edge 26 toward the wing trailing edge. The section 24 terminates to form a step 28 that defines a discontinuity in the under surface of the wing between the leading and trailing edges. As indicated in FIG. 1, the step 28 extends outwardly from the fuselage its root section at, or span-wise of the wing in the general direction of the wing Y-axis, in contrast with the angular direction of the swept-back leading edge 26 of the wing. As in the general case of airfoils that constitute aircraft wings, the relative air flow with respect to the airfoil is from the leading edge in direction generally parallel to the root section and rearwardly to the free trailing edge, and thence downstream in substantially the same general direction.

As best shown in FIG. 2, the underside of the wing is basically formed by the main section 20 and the under section 24 that is of wedge-shape with its apex coinciding with the leading edge of the wing. The wedge-like section 24 is joined to the main section 20 beneath the forward part thereof, with the wedge apex as indicated above merging with the front edge of the main section to form the leading edge 26 of the wing, and the wedge base forming the "riser" of the step at 28.

The design angle made between the sections 20 and 24, i.e. the apex angle, can be varied in accordance with aerodynamic considerations, lift, drag, etc. as also can the location of the step with respect to the trailing edge that determines the ratio between the wing top surface area (section 20) and the under surface area of section 24. The "riser" portion at 28 of the step, (indicated by dotted line in FIG. 1) can be either sealed or left open, depending on preferred construction of section 24, aerodynamic stresses, etc. For low airspeeds, the riser portion may remain comparatively open, as desired.

Reference will now be made to FIGS. 3 to 7 for a more detailed description of the new airfoil embodying the invention. As the aircraft is symmetrical with respect to its main axes, the half-sections shown in FIGS. 3 and 4 are sufficient for illustrating possible variations in the airfoil configuration. FIG. 3 indicates a conventional fuselage 30 with one wing 32 constituting an airfoil of the basic character illustrated by FIGS. 1 and 2. The view, looking toward the swept-back leading edge at 34, shows the continuous upper surface 36 of the airfoil as slightly convex between the fuselage and outer wing tip 38, as is also the lower surface 40 of the wedge-like under section 42.

For illustrating the structural form of the airfoil 32, FIGS. 3A to 3D are cross sectional views taken at the section lines A — A, B — B etc. respectively, of FIG. 3. The section nearest the fuselage (FIG. 3A) shows the wedge-like under portion 42 as having a small apex angle and extending to the step 44 at somewhat less than half the distance to the trailing edge 46. The apex angle increases somewhat at the mid-section of the airfoil, FIGS. 3B and 3C, to about 10° with the step distance from the leading edge decreasing as shown by FIG. 1. Near the wing tip, FIG. 3D, the wedge apex angle decreases for gradual tapering-off at the wing tip. The upper wing section shortens, generally according to distance from wing tip so as to conform with the wing shape of FIG. 1.

FIG. 4 illustrates the invention as embodied in a modified airfoil 50 especially adapted for high speeds, such as in the super-sonic range. Here, the apex angle of the wedge under portion 52 remains substantially constant at a small angle, such as 5–6°, throughout the leading edge 54 from the fuselage 30 to the wing tip 56. The under-surface discontinuity or step, is located with reference to the trailing edge as illustrated in FIG. 1. Accordingly, the thickness of the airfoil 50 is materially reduced as compared with FIG. 3 and the upper wing surface, as well as the lower surface of the wedge are substantially planar. The airfoil cross-sections at the transversely spaced sections A, B, C and D, are shown by FIGS. 4A to 4D respectively, and further description thereof is unnecessary in view of FIGS. 3A to 3D for an understanding of this aspect of the invention.

FIG. 5 which is a plan view, referring to FIG. 3, shows more explicitly the spacial relation between the under-surface discontinuity and the leading and trailing edges. Here, the airfoil 60 is in top plan view, with the sectional views FIGS. 5A to 5D taken as before at spaced points between the fuselage junction edge 62 and the wing tip 64. The step 66, as generally shown in FIG. 1 (and in FIGS. 5A to 5D) extends from the fuselage edge to the wing tip at a swept-back angle materially smaller than that of the leading edge 68. The apex angle in this instance can be comparatively small, i.e. ranging between 4° and 6°, so that the wing is sufficiently thin for high air speeds. Although the upper wing surface and the under surface of the wedge portion are preferably slightly convex with respect to the generally linear leading edge, these surfaces for practical purposes may be considered planar.

FIGS. 6 and 7 are different views of sections of the airfoil, FIG. 5, wherein the upper and lower wing surfaces are slightly convex with respect to the horizontal center line, FIG. 6, rather than linear as in FIG. 4. In FIG. 6 the airfoil 70 has an upper surface 72 that increases in convexity from the root or fuselage end, to the wing tip, FIG. 7. The apex angle of the under-surface wedge portion 78 varies in the manner described above for defining convex wedge surfaces as shown in FIGS. 6 and 7. The resulting airfoil is of moderate thickness suitable for lower airspeeds than those for FIG. 4; also the convex surface provide for increased stability. FIG. 7 which shows a perspective view of the airfoil at the section line 7 — 7 of FIG. 6 illustrates the relationship between the varying apex angle and height of step 79 to the convexity of the upper and lower wing surfaces.

The comparatively thin trailing portion resulting from the abrupt undersurface discontinuity as described above, is intended to be aerodynamically functional throughout full utilization of the airfoil; that is, the space beneath the thin portion downstream of the step is not intended to be occupied, as for housing auxiliary equipment, flaps, etc., that would in effect, tend to eliminate or markedly reduce the aerodynamic effect of the discontinuity.

FIGS. 8 and 9 show the invention as embodied in the airfoils of rotating wing type aircraft. In FIG. 8 a helicopter 80 is provided with rotating airfoils or blades 82 wherein at least the outer portion of each blade is constructed according to the basic configuration described above. FIG. 9 is an enlarged view of the outer (or peripheral speed) end of the rotor blade wherein the continuous upper surface 84 is substantially planar and the under surface is characterized by a wedge-like portion 86 for defining a step-like discontinuity 88 intermediate the leading edge 90 and the trailing edge 92. The apex or leading edge angle is a function of rotor r.p.m. and required lift characteristics, and as shown is approximately 10°.

Since the major part of the lift produced by helicopter blades is at the outer third of the blade length by reason of the greater swept circular area and higher blade velocity thereat, the under-surface step can be terminated as desired by gradual merging with the blade at an intermediate point as indicated by dotted lines 88 in FIG. 8. An important consideration in the use of the present airfoil for helicopter blades is that the blades can be efficiently rotated at speeds for bringing the tip speeds into the supersonic range by reason of the improved lift and drag characteristics of the thinner high speed airfoil. It will also be apparent that where desired, the invention can readily be incorporated in airfoil control sections such as elevators and rudders, as well as in the main lifting or wing sections.

Referring further to the airfoil configuration of FIG. 9, it will become apparent that the basic geometry of the airfoil can be varied to considerable extent while retaining the essential novel concept of the invention. For example, the apex or wedge angle can be varied from several degrees as described above, to as much as 30° for obtaining lift and stability characteristics under low airspeed conditions. Also, the ratio of the upper or camber surface area at 84 to the under surface area at 94 of the wedge portion (always greater than unity) can be varied by location of the discontinuity (step) with reference to the trailing edge, according to aerodynamic characteristics desired.

The upper and lower camber surfaces of the airfoil can be substantially planar, as in FIG. 4, or slightly convex as in FIGS. 3 and 6. Preferably, the convexity of these surfaces is limited at the point of maximum bow with respect to a horizontal reference to about 2 percent of the fore-aft length of the surfaces at 84 and 94 respectively. The so-called "riser" portion of the step at 88 is not limited to an approximately right angle as shown for convenience in FIGS. 3A etc. and 5A etc. but may be inclined to a greater or less extent than that shown in FIG. 9 for example.

As regards accepted aerodynamic theory, the technical reasons for the improved performance of the present airfoil are unknown to the inventors. Small-scale airplanes constructed according to the configurations of FIGS. 1 and 3 were tested in flight and demonstrated unusually good lift, stability and pitching moment characteristics; further, the airfoil parameters thereof were found by modern computer technique, to be suitable for both high speed and low speed conditions, and to have lift, drag and moment characteristics within the limits of modern aerodynamic design criteria.

Although the invention in its preferred form is shown applied to the airfoils of aircraft, application as well to guided-entry type space craft, missiles, etc. in instances where airfoils are used, is implicit.

Having set forth the invention in what is considered to be the best embodiment thereof, it will be understood that changes may be made in the apparatus as above set forth without departing from the spirit of the invention or exceeding the scope thereof as defined in the following claims.

What is claimed is:

1. An aircraft wing that is connected at its root end to the aircraft, comprising:
   a. a main, generally flat portion, one side of which constitutes a continuous positive camber surface of the wing,
   b. the opposite side of the wing defining a negative camber surface that is formed in part by the main portion and in part by a wedge-shape portion joined to said main portion,
   c. the wedge apex coinciding with one edge of said main portion to define the leading edge of said wing and the transversely opposite edge of said main portion defining the trailing edge of said wing,
   d. and the wedge portion terminating along a base line materially in advance of the trailing edge for defining a step-like discontinuity that is an essential aerodynamically functional part of the negative camber surface of the wing, the width of the wedge portion from the leading edge to the base line at a respective chord decreasing according to the chord distance from the wing tip.

2. An aircraft wing as specified in claim 1 wherein the positive camber profile from the leading edge to the trailing edge at a chord section of the wing is essentially linear, and the positive camber surface extending between the root and tip ends of the wing is slightly convex with respect to the longitudinal axis of the wing.

3. An aircraft wing as specified in claim 1 wherein the leading edge of which is positioned at a swept-back angle, and the base line of the wedge portion extends toward the wing tip in a converging direction with respect to the leading edge.

4. An aircraft wing as specified in claim 1 wherein the wedge apex angle throughout the leading edge is substantially constant, coincident with change in width of the wedge portion at respective chord sections.

5. An aircraft wing as specified in claim 2 wherein the wedge apex angle varies from a maximum at an intermediate part of the leading edge to a minimum at the wing tip.

6. An aircraft wing as specified in claim 5 wherein the positive and negative camber surfaces between the root and tip ends of the wing have slight convexity.

* * * * *